US007294312B2

(12) United States Patent
Green et al.

(10) Patent No.: US 7,294,312 B2
(45) Date of Patent: Nov. 13, 2007

(54) TEST CARTRIDGE HOLDER FOR BLOOD SAMPLES

(75) Inventors: Michael M. Green, Burnsville, MN (US); Douglas D. Nippoldt, Oakdale, MN (US); William D. Zillmann, Parker, CO (US); Brent E. Wallace, Highlands Ranch, CO (US); Jeff N. Rejent, Aurora, CO (US)

(73) Assignee: Medtronic, Inc., Minneapolis, MN (US)

(*) Notice: Subject to any disclaimer, the term of this patent is extended or adjusted under 35 U.S.C. 154(b) by 608 days.

(21) Appl. No.: 10/371,351

(22) Filed: Feb. 20, 2003

(65) Prior Publication Data

US 2004/0166590 A1 Aug. 26, 2004

(51) Int. Cl.
*G01N 1/10* (2006.01)
*B01L 9/00* (2006.01)

(52) U.S. Cl. ........................ 422/104; 422/99; 422/102; 436/66; 436/67; 436/68; 436/69; 436/70; 604/68; 604/154; 604/155

(58) Field of Classification Search .......... 422/99–104; 436/66–70, 174, 179; 604/68, 154, 155
See application file for complete search history.

(56) References Cited

U.S. PATENT DOCUMENTS 4,599,219 A 7/1986 Cooper et al. ................ 422/61
4,610,666 A * 9/1986 Pizzino ....................... 604/191
4,752,449 A 6/1988 Jackson et al. ............... 422/73
4,936,833 A * 6/1990 Sams ......................... 604/232
5,174,961 A 12/1992 Smith ......................... 422/73
5,295,967 A * 3/1994 Rondelet et al. ............ 604/154
5,314,826 A 5/1994 Baugh ......................... 436/69
5,370,842 A 12/1994 Miyazaki et al.
5,487,738 A * 1/1996 Sciulli ........................ 604/414
5,533,981 A * 7/1996 Mandro et al. ............. 604/208
5,545,140 A * 8/1996 Conero et al. .............. 604/154
5,766,550 A 6/1998 Kaplan
5,814,015 A * 9/1998 Gargano et al. .............. 604/67
5,888,826 A 3/1999 Ostgaard et al.
5,925,319 A 7/1999 Baugh et al. ................. 422/73
6,019,745 A * 2/2000 Gray .......................... 604/131
6,071,294 A 6/2000 Simons et al.
6,114,122 A 9/2000 Besemer et al.
6,132,414 A * 10/2000 Herbst et al. ............... 604/403
6,232,127 B1 5/2001 Lane et al.
6,485,465 B2 * 11/2002 Moberg et al. ............. 604/154
6,887,216 B2 * 5/2005 Hochman et al. ............. 604/67
6,932,242 B2 * 8/2005 Gerlach et al. ............. 222/113

* cited by examiner

*Primary Examiner*—Jill Warden
*Assistant Examiner*—Dwayne K. Handy
(74) *Attorney, Agent, or Firm*—Mike Jaro; Jeffrey J. Hohenshell

(57) ABSTRACT

Improved methods and apparatus that make more accurate and reduces risk of filling reaction chambers of cartridge cells with blood samples to conduct blood coagulation tests of the type employing the plunger technique are disclosed. A cartridge holder is provided that secures a test cartridge in a fixed upright position and deflects the plunger flag of each cartridge cell to enable manual insertion of a blood dispenser deeply into the reaction chamber to fill the reaction chamber and avoid contamination of surfaces of the cartridge outside the reaction chamber. Preferably, the cartridge holder provides illumination of the reaction chamber during filling, so that the user can judge when the reaction chamber is properly filled with blood dispensed from the blood dispenser. The cartridge holder may incorporate image magnification to facilitate viewing of the reaction chamber as it is filled.

20 Claims, 7 Drawing Sheets

FIG. 2
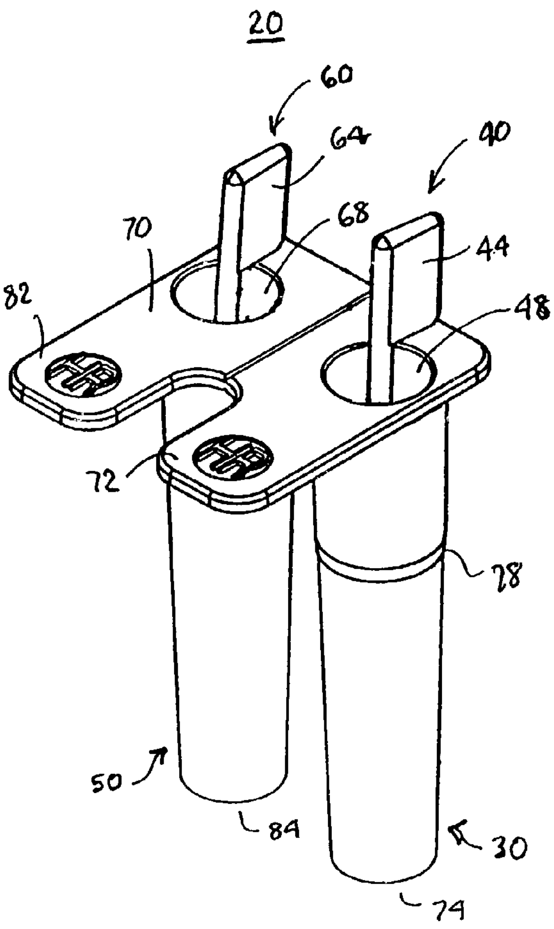
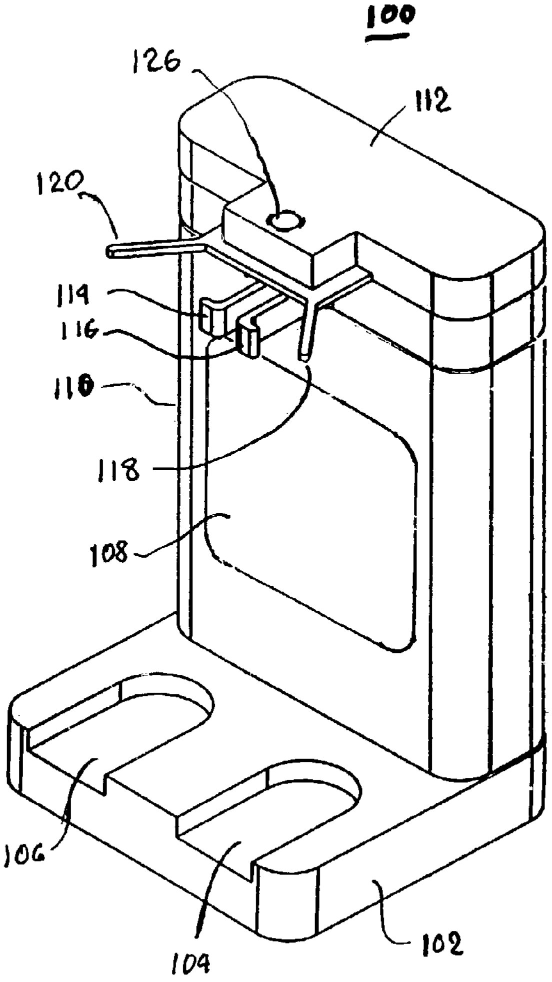
FIG. 3

TEST CARTRIDGE HOLDER FOR BLOOD SAMPLES

FIELD OF THE INVENTION

This invention relates to measuring and detecting coagulation and coagulation-related activities in fluids, particularly human blood, and more particularly to improved methods and apparatus for filling a reaction chamber of a test cartridge with a blood sample.

BACKGROUND OF THE INVENTION

Blood coagulation is a complex chemical and physical reaction that occurs when blood (herein, "blood" shall mean whole blood, citrated blood, platelet concentrate or plasma, unless otherwise specified) comes into contact with an activating agent, such as an activating surface or an activating reagent. In accordance with one simplified conceptual view, the whole blood coagulation process can be generally viewed as three activities: platelet adhesion, platelet aggregation, and formation of a fibrin clot. In vivo, platelets flow through the blood vessels in an inactivated state because the blood vessel lining, the endothelium, prevents activation of platelets. When a blood vessel is damaged, however, the endothelium loses its integrity and platelets are activated by contact with tissue underlying the damaged site. Activation of the platelets causes them to become "sticky" and adhere together. Additional platelets then adhere to the activated platelets and also become activated. This process continues until a platelet "plug" is formed. This platelet plug then serves as a matrix upon which blood clotting proceeds.

If the chemical balance of the blood is suitable, thrombin is then produced that causes fibrinogen to convert to fibrin, which forms the major portion of the clot mass. During clotting, additional platelets are activated and trapped in the forming clot, contributing to clot formation. As clotting proceeds, polymerization and cross-linking of fibrin results in the permanent clot. Thus, platelet activation plays a very important function in blood coagulation.

The clinical assessment of clotting function has long been recognized to be important in the management of surgical patients. Preoperatively, the assessment of the clotting function of the patient's blood is utilized as a predictor of risk of patient bleeding, allowing advanced preparation of blood components. Perioperative monitoring of the clotting function of the patient's blood is also important because coagulopathies can be induced by hemodilution of procoagulants, fibrinogen and platelets, by consumption of coagulation factors during surgical procedures, or by cardiopulmonary bypass. Post operative assessment of clotting function is also crucial to the patient's successful recovery. For example, 3-5% of cardiopulmonary bypass patients require surgical reoperation to stop bleeding. Prompt assessment of clotting function could rule out coagulopathy as the cause of bleeding and could avoid unnecessary surgery that adds to patient morbidity and treatment costs.

Several tests of coagulation are routinely utilized to assess the complicated cascade of events leading to blood clot formation and test for the presence of abnormalities or inhibitors of this process. Among these tests are platelet count (PLT), prothrombin time (PT), partial thromboplastin time (aPTT), activated clotting time (ACT), fibrinogen level (FIB) and fibrinogen degradation product concentrations. The aPTT test can also be used to assess the degree of anticoagulation resulting from heparin administration, while the PT test results can indicate the level of anticoagulation produced by warfarin administration.

During heart bypass surgery, the platelets of blood circulated in an extracorporeal circuit may become activated by contact with the materials present in the extracorporeal circuit. This activation may be reversible or irreversible. Once platelets are irreversibly activated, they lose their ability to function further. A deficiency of functional platelets in the blood may be indicative of an increased probability of a post-operative bleeding problem. Such a deficiency, and the, resulting post-operative bleeding risk, could be remedied by a transfusion of platelet concentrate. Platelet functionality tests, e.g., the ACT test, can identify a deficiency of platelets or functional platelets and aid the attending surgeon in ascertaining when to administer a platelet concentrate transfusion. Such a test is further useful in ascertaining the efficacy of a platelet transfusion. By performing the platelet functionality test following a platelet transfusion, it is possible to determine if additional platelet concentrate transfusions are indicated. Real-time assessment of clotting function at the operative site is preferred to evaluate the result of therapeutic interventions and also to test and optimize, a priori, the treatment choice and dosage.

A number of different medical apparatuses and testing methods have been developed for measuring and determining platelet activation and coagulation-related conditions of blood that can be used in real time during surgery, particularly bypass surgery, on fresh drawn blood samples or that can be used after some delay on citrated blood samples. Some of the more successful techniques of evaluating blood clotting and coagulation of fresh or citrated blood samples employ plunger techniques disclosed in commonly assigned U.S. Pat. Nos. 4,599,219, 4,752,449, 5,174,961, 5,314,826, 5,925,319, and 6,232,127, for example.

As shown in the figures of the '127 patent, for example, these automated instruments employing the plunger technique for measuring and detecting coagulation and coagulation-related activities receives a blood filed syringe and a cartridge. The cartridge includes a plurality of test cells, each of which is defined by a tube-like member having an upper reaction chamber where the analytical test is carried out and a lower reagent chamber that contains a reagent or reagents and/or other compounds as disclosed in the above-referenced commonly assigned patents. For example, the reagents and compounds in at least one of the cells comprise a platelet activation reagent to activate coagulation of the blood in order to determine the ACT.

As disclosed in the above-referenced '127 patent, certain discoveries have been made which contribute to a better understanding of the role of platelets in an ACT test. Such discoveries suggest that the activation of the platelets has a significant and previously unappreciated effect on ACT test results. While it has long been suspected that platelet activation contributes to total blood coagulation times, until fairly recently, there has been no technique available for confirming and quantifying the impact of platelet activation on ACT. The above-referenced '826 patent discloses an improved ACT test that includes a platelet activation phase to accommodate the effects of platelet activation. An activating reagent is mixed with a sample of blood to be tested, and then the mixture is gently agitated in such a manner and for a period of time sufficient to establish a predetermined and predictable contribution to the ACT from platelet activation. Two simultaneous ACT tests (with different platelet activation phases) are performed to evaluate platelet function, and the difference between the resulting ACT tests is indicative of the platelet functionality of the sample of blood. In a further improvement disclosed in the above-referenced '319 patent, the sample of blood is mixed with a chemical platelet activating agent to facilitate the participation of active platelets in the blood clotting reaction, thereby shortening the clotting time of the blood. If the platelets are inactive or not functioning normally, the activator will have minimal or no effect on the clotting time.

More particularly, each cartridge cell is formed by a downwardly tapered, open-ended, tube of transparent glass or plastic material. A resilient, flexible, sliding plug seals the lower end opening of the tube below the reagent chamber. The sliding plug is adapted to be engaged and driven upward into the reagent chamber by a plug driver shaft of the instrument. The tube wall is shaped to define an inwardly projecting annular seat intermediate the upper reaction chamber and the lower reagent chamber. The annular seat defines an upper annular sealing surface and a lower annular sealing surface. Each cartridge cell contains an elongated plunger that comprises an elongated plunger shaft extending between an upper, laterally extending "flag" disposed above the tube upper end opening and a sealing washer or disk (also referred to as a "daisy") that is initially seated against the upper and lower annular sealing surfaces to seal the reaction chamber from the reagent chamber when a blood sample is dispensed into the reaction chamber. The plunger shaft is disposed in the center of the reaction chamber when the plunger is seated.

The use of the instrument and the cartridge is depicted in FIG. 5 of the above-referenced '127 patent. A syringe filled with blood is manually inserted into a syringe receptacle of the instrument. The cartridge is manually inserted into a cartridge receptacle of the automated coagulation timer instrument. Discrete blood samples are automatically dispensed from the syringe into the upper reaction chambers of the cells. When the test commences, an actuator of the instrument engages all of the flags of the plunger assemblies in the cells of the cartridge and lifts the plunger assemblies to unseat the respective sealing disks. At the same time, the plug driver shafts are driven upward against the plugs to move the plugs upward and force the contents of the reagent chambers through the seat opening into the reaction chambers to be mixed with the blood samples. The plunger assemblies are moved up and down one or more times to mix the blood samples and reagent. The plunger flags are lifted to a starting position and released by the actuator. The plunger assembly descends by the force of gravity, resisted by the viscosity of the blood in the reaction chamber, until the sealing disk either contacts the upper annular sealing surface or is halted by contact with a blood clot that forms in the reaction chamber above the upper annular sealing surface.

The movement of the flag of the plunger assembly is photo-optically tracked by the instrument. The instrument detects and times out the movement of the plunger assembly and the point at which it stops descending in a manner disclosed in the above-referenced '127, '219, and '319 patents. The coagulation-related activity is detected upon a sufficient change in the descent rate and indicated by the instrument. In particular, the ACT of the blood in each cell of the cartridge is timed out, displayed, and stored in memory, and the cartridge array is withdrawn from the cartridge receptacle.

A less expensive and simplified, ACT II® automatic coagulation timer, is commercially sold by the assignee of this patent application that receives a cartridge having two cells of the type described above that are already filled with blood by a user as described below. The ACT II® instrument does not include the receptacle for the blood filled syringe and the automatic blood dispenser for moving the syringe over each upper cell opening and ejecting the blood sample from the syringe.

In use of the simplified ACT II® instrument to determine coagulation time of a whole blood sample or plasma in an operative procedure, the user typically draws the patient's whole blood or plasma into a syringe and then manually dispenses the blood samples into the upper reaction chambers of the two cartridge cells. For samples that are citrated, the use of a precision pipettor and pipette tips can alternatively be used. It is important that the amount of blood dispensed into each reaction chamber be relatively equal and sufficient in volume without over-filling the reaction chamber to accurately perform the ACT tests and avoid contamination of the instrument. Thus, the user must carefully judge and visually observe the amount of blood ejected from the syringe or pipettor into the reaction chamber.

The blood must dispensed deeply into the reaction chamber to avoid depositing blood droplets on the flag or on the plunger shaft above the upper level of the blood sample that would tend to weight the plunger and contaminate the cartridge receptacle of the instrument. Thus, the user must take care to properly deposit the blood sample into the reaction chamber of each cell.

The flag must be manually deflected to one side of the cell without breaking the seal between the upper reaction chamber and the lower reagent chamber to insert the needle or pipette tip into the upper open end. Therefore, the user typically grasps the cartridge and pushes the flag aside with a gloved finger when the needle tip or pipette tip is inserted through the upper open end. The syringe needle tips are sharp, and there is a possibility of a needle puncture of the user's finger or hand when holding the cartridge steady and upright and diverting the flag aside to insert the needle tip into the upper open end.

Thus, although previous instruments using the plunger sensing technique have proven generally satisfactory, the need for certain enhancements has been identified.

BRIEF SUMMARY OF THE INVENTION

Therefore, the present invention simplifies, makes more accurate, and reduces risk of filling reaction chambers of cartridge cells with blood or blood components (herein blood) to conduct blood coagulation tests of the type employing the plunger technique.

In a first aspect of the invention, a cartridge holder is provided that secures the cartridge in a fixed upright position and deflects the plunger flag of each cartridge cell to enable manual insertion of a blood dispenser deeply into the reaction chamber to fill the reaction chamber and avoid contamination of surfaces of the cartridge outside the reaction chamber. In this way, the user need not hold the cartridge itself or deflect the flags with a finger during filling.

In a second aspect of the invention, the cartridge holder provides illumination of the reaction chamber during filling, so that the user can judge when the reaction chamber is properly filled with blood dispensed from the syringe or pipette.

In a third aspect of the invention, the cartridge holder incorporates image magnification lenses that facilitate viewing of the reaction chamber with blood, so that the user can judge when the reaction chamber is properly filled with blood dispensed from the blood dispenser.

This summary of the invention has been presented here simply to point out some of the ways that the invention overcomes difficulties presented in the prior art and to distinguish the invention from the prior art and is not intended to operate in any manner as a limitation on the interpretation of claims that are presented initially in the patent application and that are ultimately granted.

BRIEF DESCRIPTION OF THE DRAWINGS

These and other advantages and features of the present invention will be more readily understood from the following detailed description of the preferred embodiments thereof, when considered in conjunction with the drawings, in which like reference numerals indicate identical structures throughout the several views, and wherein:

FIG. 2 is a perspective view of the two-cell ACT test cartridge adapted to be inserted into a cartridge receptacle of the ACT instrument of FIG. 1;

FIG. 3 is a perspective view of a cartridge holder of first and second embodiments the present invention adapted to receive the two-cell test cartridge of FIG. 2 and, in the second embodiment, to illuminate the reaction chambers to facilitate viewing blood injection into the reaction chambers;

DETAILED DESCRIPTION OF THE INVENTION

In the following detailed description, references are made to illustrative embodiments of methods and apparatus for carrying out the invention. It is understood that other embodiments can be utilized without departing from the scope of the invention. Preferred methods and apparatus are described for performing ACT tests of the type described above.

Figure 4:
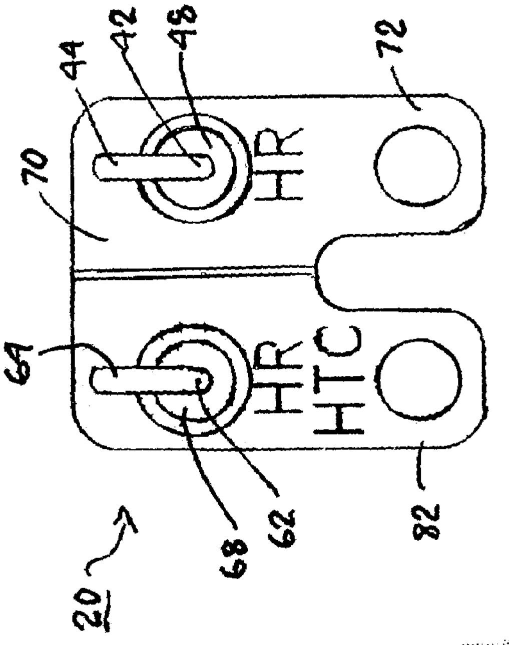
FIG. 4 is a top view of a two-cell ACT test cartridge adapted to be inserted into a cartridge receptacle of the ACT instrument of FIG. 1.
Figure 1:
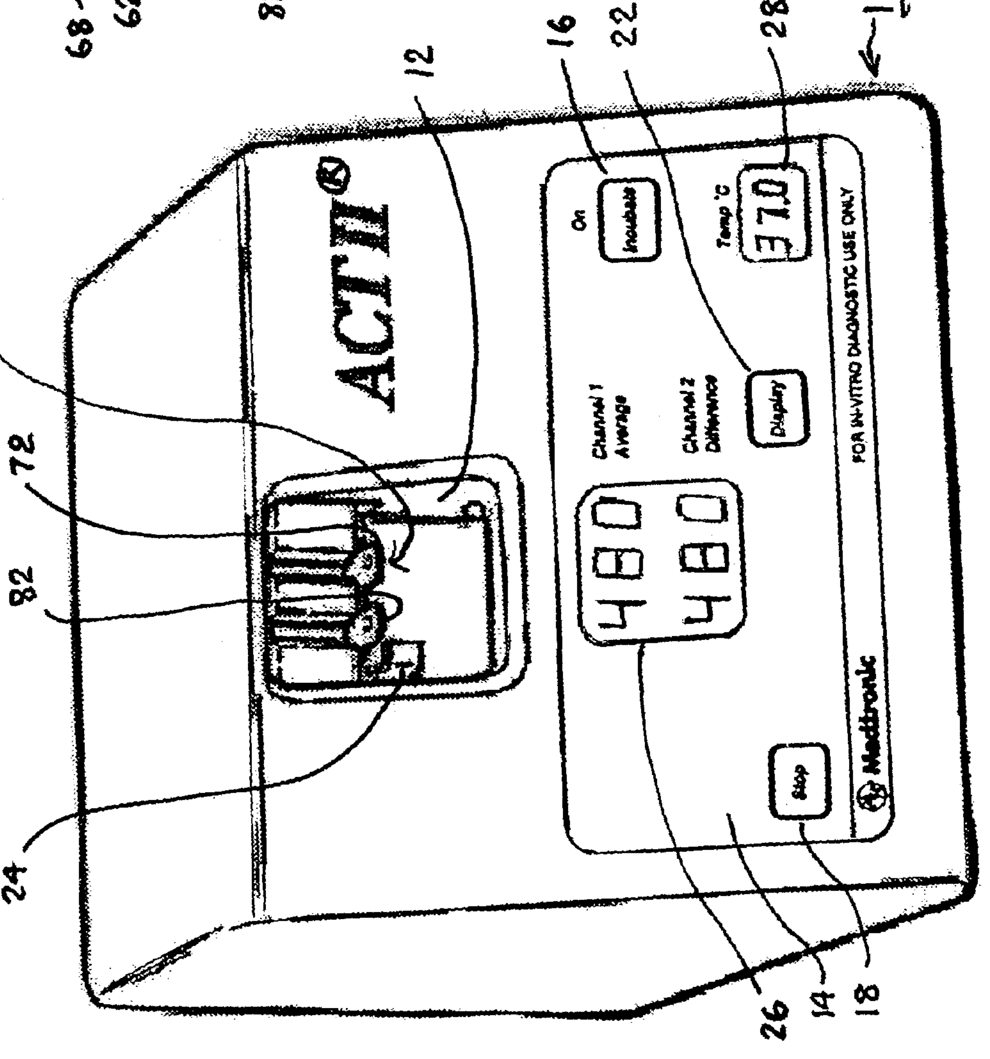
FIG. 1 is perspective view of a simplified ACT instrument that can advantageously be used in the practice of the present invention.

FIG. 1 is perspective view of the simplified ACT II® automatic coagulation timer instrument 10 that can advantageously be used in the practice of the present invention. The ACT II® instrument 10 is portable and is operated by power from an AC line cord. The ACT II® instrument 10 has a cartridge receptacle or heat block 12 that receives an ACT test cartridge 20 shown in more detail FIG. 2. The ACT II® instrument can incubate and conduct ACT tests on blood samples injected from the same blood source into the reaction chambers of the two cells of the ACT test cartridge 30 or just a single blood sample injected from the source into one of the reaction chambers of the ACT test cartridge 30. For convenience, it will be assumed in the following description that comparative ACT tests are to be conducted on blood samples injected from the same blood source into both reaction chambers of the two cells of the ACT test cartridge 30 and mixed with differing reagents contained in the reagent chambers of the two cells. Such reagents used in performing comparative ACT tests can include a reagent, e.g., kaolin, which activates the blood to form a fibrin clot. A number of ACT test cartridges having differing reagent formulations are available for use with the ACT II® instrument and are denoted by labels, e.g., HTC, LR-ACT, HR-ACT, and R-ACT. The endpoint of the ACT test is the detection of the fibrin clot by the ACT II® instrument.

Controls located on the front panel 14 include an Incubate switch 16, a Stop switch 18, a Display switch 22, and a manual Start/Stop lever 24. The front panel 14 also contains indicators and displays. Four amber back lit indicators show whether the red displays are indicating the channel clotting times ("Channel 1" and "Channel 2" are illuminated), or the average and difference ("Average" and "Difference" are illuminated). One amber back lit indicator show whether the Incubate switch 16 is activated ("ON" is illuminated).

A numerical temperature display 28 displays the actuator heat block temperature that is nominally body temperature or 37° C. A numerical elapsed time display 26 is provided to display the remaining incubation time when incubation is taking place as well as the ACT test time readings of the blood samples in the reaction chambers of the two cells of the test cartridge 20 described below. The elapsed ACT test times between 6 and 100 seconds are displayed in $1/10$ second resolution if the ACT tests are conducted following incubation of the blood samples in the reaction chambers of the two cells of the test cartridge 20. Any ACT test times exceeding 100 seconds are displayed in whole seconds because the $1/10$ resolution after 100 seconds is not deemed critical. Also, the time display 26 is limited to three digits. The elapsed ACT test times are displayed in whole seconds when an ACT test is conducted on the blood samples in the reaction chambers of the two cells of the test cartridge 20 without prior incubation of the blood samples by the ACT II® instrument 10. The 1/10 second resolution is not necessary in this case because it is not critical for the type of test performed.

The sensors and circuitry of the ACT II® instrument 10 conduct the ACT tests on the blood samples in the reaction chambers of the two cells of the test cartridge 20 inserted into the actuator heat block 12 in a manner described further below. Depression of the push-button Display switch 22 controls the ACT test results that are displayed in the front panel display 26. Sequentially depressing the Display switch 22 cycles the front panel ACT test display between the separate clotting times for the two blood samples indicated by the illumination of "Channel 1" and "Channel 2" or the average of the two clotting times indicated by the illumination of "Average" and the difference between the two clotting times indicated by the illumination of "Difference". The "Average" and "Difference" can only be displayed by depressing push button display switch 22 upon determination and display of the separate "Channel 1" and "Channel 2" clotting times for the two blood samples.

The actuator heat block 12 can be rotated by the user between a closed position shown in FIG. 1 and an open position. A test cartridge 20 can be inserted into or removed from the heat block 12 when the heat block 12 is in the open position. A test cartridge 20 is depicted enclosed within the actuator heat block 12 in FIG. 1 The operator initiates an ACT test of the blood samples in the reaction chambers of the two cells of the test cartridge 20 by inserting the test cartridge 20 into the actuator heat block 12 and rotating the actuator heat block 12 to the closed position. The rotation of the heat block 12 to the closed position can be accomplished by pushing on the manual Start/Stop lever 24 on the upper left side of the heat block 12 while holding tabs 72 and/or 82. The actuator heat block 12 automatically rotates to the open position when the ACT test is completed.

Manual incubation or ACT test termination is also possible by pulling either the manual Start/Stop lever 24 to rotate the actuator heat block 12 to the open position. The push-button Stop switch 18 can also be depressed by the user to terminate either of the incubation phase or the ACT test that is in progress and to rotate the actuator heat block 12 to the open position. The incubation or test time that is displayed in display 26 when the Stop switch 18 is depressed is frozen and the displayed time flashes.

For consistency and accuracy, some ACT tests must be conducted on blood samples that are "incubated" in the reaction chambers of the two cells of the test cartridge 20 by maintaining the blood samples at body temperature for a defined incubation time period. Incubation of the blood samples is a process that involves heating the blood samples to body temperature for an incubation period that in this instance constitutes 300 seconds unless the user terminates the incubation earlier. It is necessary to incubate citrated whole blood, plasma, or quality control samples prior to running ACT tests because they are typically chilled or at room temperature. Incubation is also used when conducting ACT tests of fresh whole blood employing the ACT II® instrument so that the ACT tests are consistently performed at 37° C. and not at blood sample temperatures that are elevated or depressed from 37° C.

Heater elements in the actuator heat block 12 are powered up when the ACT II® instrument 10 is turned on to heat up the actuator heat block 12 to body temperature as displayed in temperature display 28. The temperature of the actuator heat block 12 is regulated to maintain body temperature during the ACT test. The blood samples in the reaction chambers of the two cells of the test cartridge 20 can also be incubated prior to the start of the ACT test for an incubation time. The Incubate switch 16 is illuminated when the blood samples in the reaction chambers of the two cells of the test cartridge 20 are being incubated prior to commencement of the ACT tests on the blood samples. A rear panel dip-switch (not shown) can be set to a first position to enable continuous incubation except during ACT tests thereby causing the Incubate switch 16 to remain illuminated except when an ACT test is in progress. The rear panel dipswitch can be set to a second position requiring that incubation of the blood samples in the reaction chambers of the two cells of the test cartridge 20 be manually initiated by the user pressing the Incubate switch 16 whereupon the Incubate switch 16 is illuminated.

Thus, when an ACT test that uses the incubation feature of the ACT II® instrument 10 is being performed, the incubation phase starts either upon insertion of the test cartridge 20 into the actuator heat block 12 or when the Incubate switch 16 is depressed. If the incubation phase is commenced, the remaining incubation time is displayed in display 26 from the start time of 300 seconds down to zero until "0" is reached.

The coagulation timing phase of the ACT test automatically begins when the incubation phase times out. However, the incubation phase may be terminated at any time during its time-out by pressing the Incubate switch 16, and the ACT test automatically starts.

Referring to FIGS. 2 and 4-6, the test cartridge 20 comprises two elongated, tubular, tapered cells 30 and 50 joined together by a cartridge plate 70 having two forward extending tabs 72 and 82. The cartridge cells 30 and 50 are formed by downwardly tapered, open-ended, tubes of transparent glass or plastic material. The tube walls of the cartridge cells 30 and 50 are shaped to define inwardly projecting annular seats 36 and 56, respectively, intermediate upper reaction chambers 32 and 52, respectively, and lower reagent chambers 34 and 54, respectively. As noted above, the test cartridge 20 enables conducting duplicate tests on blood samples injected from the same blood source into the reaction chambers 32 and 52 or just a single blood sample injected from the source into one of the reaction chambers 32 or 52.

Figure 6:
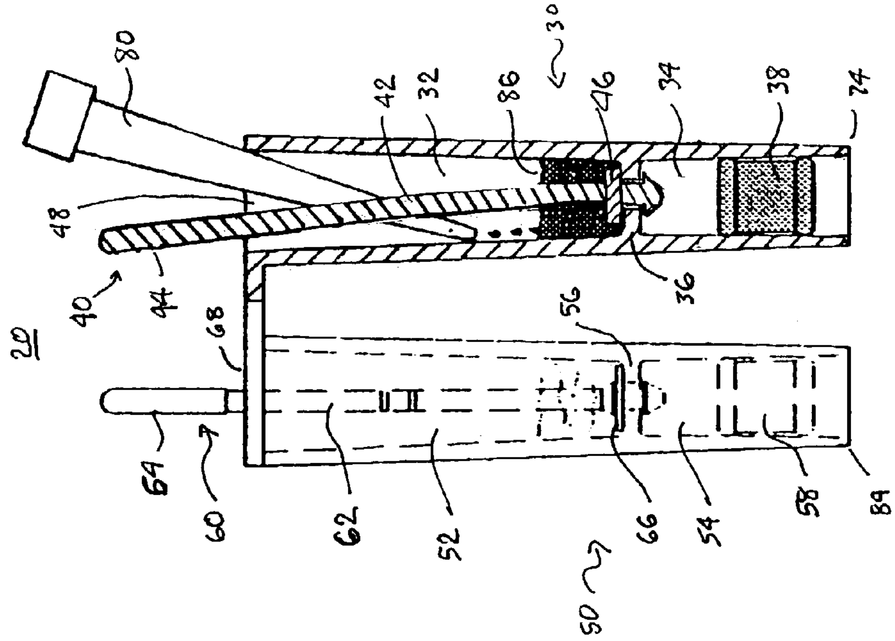
FIG. 6 is a side view in partial cross-section taken along lines 6-6 of FIG. 5 showing the pipette tip inserted through the top opening into one of the cartridge cell reaction chambers to fill the reaction chamber with blood while the plunger flag is deflected aside.
Figure 5:
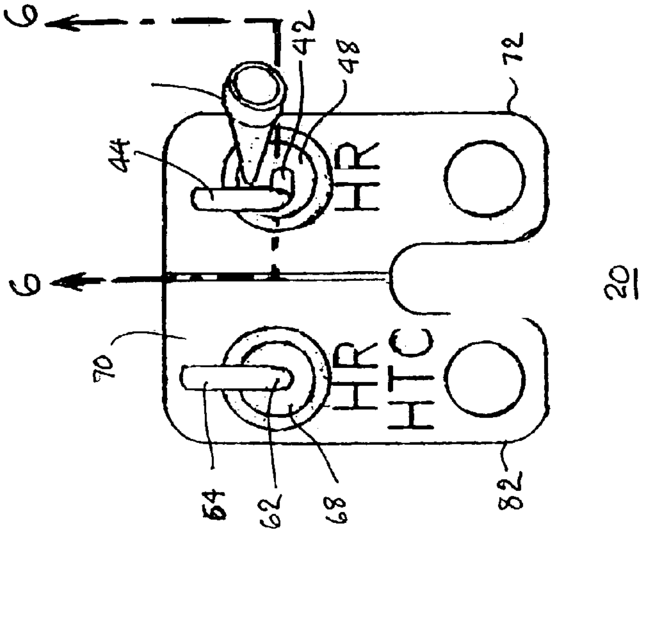
FIG. 5 is a further top view of a two-cell ACT test cartridge adapted to be inserted into a cartridge receptacle of the ACT instrument of FIG. 1 with a pipette tip inserted through the top opening into one of the cartridge cell reaction chambers while the plunger flag is deflected aside.

As shown in FIG. 6, the cartridge cells 30 and 50 contains elongated plunger assemblies or plungers 40 and 60 that comprise elongated plunger shafts 42 and 62, respectively, extending between upper, laterally extending, flags 44 and 64 and lower sealing daisies 46 and 56, respectively. The sealing daisies 46 and 56 are initially seated against annular sealing surfaces of the seats 36 and 56, respectively, to seal the reaction chambers 32 and 52, respectively, from the reagent chambers 34 and 54, respectively, when blood samples are dispensed into the reaction chambers 32 and 52. The plunger shafts 42 and 62 are disposed to extend upward axially in the centers of the reaction chambers 32 and 52, respectively, to dispose the flags 44 and 64 extending in parallel above the cell upper end openings 48 and 68 when the plungers 40 and 60 are seated.

The lower reagent chambers 34 and 54 contain liquid or powdered reagents of the types described above. Resilient, flexible, sliding plugs 38 and 58 seal the lower end opening of the tubular cells 30 and 50 below the reagent chambers 34 and 54, respectively. The sliding plugs 38 and 58 are adapted to be engaged and driven upward into the reagent chambers 34 and 54, respectively, by plug driver shafts of the ACT instrument 10 when the test cartridge 20 is inserted into the actuator heat block 12 and the ACT test is initiated.

In use, the empty test cartridge 20 is either pre-warmed in an external heat block or warmed by the heating elements included in the actuator heat block 12 of the ACT instrument 10 that are activated as described above when the test cartridge 20 is inserted into the heat block 12. The warmed test cartridge 20 is removed from the actuator heat block 12, and the upper reaction chambers 32 and 52 are filled with the blood samples.

One conventional practice of filling the upper reaction chambers 32 and 52 is illustrated in FIG. 6 wherein a tapered pipette 80 is inserted through the upper end opening 48 to dispose the pipette tip deeply within the upper reaction chamber 32 while the flag 44 is manually pushed aside. The blood sample 86 is ejected from a pipettor (not shown) through the pipette 80 into the upper reaction chamber 32 while care is taken to avoid contamination of the flag 44 and shaft 42 and needle punctures of the user's hand or finger (not shown) deflecting the flag 44. The user also has to determine when the blood sample reaches a fill line 78 (FIG. 2). So the user has to carefully hold the test cartridge 20, the pipette 80, and the flag 44 in the upright position, operate the pipettor to eject blood through the pipette 80, and watch the fill line 78 to halt dispensing when the blood sample 86 reaches the fill line 78.

Similarly, when blood is dispensed from a syringe into the reaction chamber 32, for example, the user has to carefully hold the test cartridge 20 upright, divert the flag 44 with a finger, and insert the sharp needle tip into the upper end opening and downward into the upper reaction chamber 32. There is a danger that the user's finger diverting the flag 44 will be punctured by the sharpened needle tip potentially endangering and inconveniencing the user in as much as such needle punctures require immediate attention following clinical procedures. The blood to be tested would also have to be drawn again or obtained and the ACT test restarted by filling the upper reaction chambers 32 and 52 of a new ACT cartridge 20 with the blood samples.

The test cartridge 20 filled with the blood samples is then inserted into the actuator heat block 12, and the actuator heat block 12 is rotated back into its closed position. When the actuator block is in the closed position, the ACT test is either initiated immediately or the incubation mode is initiated followed by the start of the ACT test. A lift wire within the actuator heat block 12 engages the flags 42 and 62 of the plunger assemblies 40 and 60. Initiation of the ACT test causes the lift wire to rise to thereby lift the flags 44 and 64 and the plunger shafts 42 and 62 and to unseat the daisies 46 and 66. At the same time, the plugs 38 and 58 are forced upward to eject the reagents from the reagent chambers 34 and 54 into the respective reaction chambers 32 and 52 to be mixed with the blood samples.

As noted above, prior to the start of the ACT test, the blood samples may have to be incubated. When the ACT test starts, it is also necessary to mix blood samples with the reagents. Preferably, when incubation of whole blood samples does not take place, the ACT test instrument cycles the lift wire upward and downward over a 20 second period to move the daisies 46 and 66 upward and downward to mix the whole blood sample with the reagent. The motion of the actuator lift wire and the manner in which the plunger assembles 40 and 60 are manipulated in the test cartridge 20 is therefore dependent on whether or not the incubate phase has been performed. In fresh whole blood tests that should be performed without any incubation, the ACT II® instrument 10 will not detect a clot before 20 seconds time out due to the mix cycle that occurs in those first 20 seconds.

The presence and motion of the flags 44 and 64 is sensed by photo-optic flag motion sensors (not shown) of the ACT II® instrument 10. The actuator lift wire lifts upward when the actuator heat block 12 is rotated to the closed position, and logic circuitry determines from the output signal of the flag motion sensor whether a test cartridge 20 is present or absent from the actuator heat block 12. In the latter case, an error code is displayed in display 26, and the actuator heat block is rotated to the open position.

Clot detection mechanisms relate the detection of clot formation to the presence of polymerized fibrin in the blood samples undergoing test. When fibrin polymerizes, optical turbidity increases (photo-optical plasma based clotting instruments), viscosity increases (viscometric clotting instruments), and ultimately either fibrous strands or a gel forms (mechanical clotting instruments). The clot detection mechanism of the ACT II® instrument 10 depicted in FIG. 1 depends on strand and gel formation in the blood samples within the reaction chambers 32 and 52 of the test cartridge 20 that impede the descent of the plungers 40 and 60. If the formation of a clot within the reaction chamber 32 and 52 is rapid, normally a gel will form that suspends the plunger daisy 46 and 66 above the respective seat 36 and 56 leading to detection of a clot. As fibrin strands form in a reaction chamber 32 or 52, the fibrin strands preferentially adhere to the respective daisy 46 or 66 due to the chemical composition of the daisy 46 or 66. The fibrin strands fill in the petals of the daisy 46 or 66 causing increased resistance to movement as the daisy 46 or 66 slowly drops through the blood sample. The slowing in the rate of descent of the flags 44 or 64 is detected by the photo-optic flag motion sensor leading to a declaration of the ACT for the blood sample in the reaction chamber 32 or 52, respectively, and display of the ACT test results in display 26 as described above.

In accordance with the present invention, cartridge holders are provided that secure the test cartridge 20 in a fixed upright position and deflect the plunger flags 44 and 64 of each cartridge cell 30 and 50 to enable manual insertion of a blood dispenser, e.g., pipette 80 or a syringe or any other blood dispenser, deeply into the reaction chambers 32 and 52 to fill the reaction chambers 32 and 52 and avoid contamination of surfaces of the cartridge 20. The user need not hold the test 20 cartridge itself or deflect the flags 44 and 64 with a finger during filling. The cartridge holders of the present invention can also advantageously be employed to fill other test cartridges with other fluids for performing tests.

Such a cartridge holder 100 is depicted in FIG. 3 that receives and holds a test cartridge 20 in an upright orientation and deflects the flags 44 and 64 aside to facilitate filling of the reaction chambers 32 and 52 with the requisite amount of blood. The cartridge holder 100 comprises a base 102, a rear frame 110 extending upward from the rear of base 102, and a flag deflector 112 at the upper end of the rear frame 102. The flag deflector 112 comprises a pair of flag deflecting arms 118 and 120 extending away from the rear frame 102 and diverging apart from one another above the upper surface of the base 102. In addition, a pair of spring detents 114 and 116 extend outward from the rear frame 102 and above the upper surface of the base 102 that engage the sides of the cartridge cells 50 and 30, respectively. The upper surface of the base 102 is shaped to have a pair of recesses 104 and 106 for receiving the free ends 74 and 84 of the cartridge cells 30 and 50. A spring-loaded detent 126 is intended to apply force downward against plate 70 to vertically hold down and stabilize the test cartridge 20.

Figure 8:
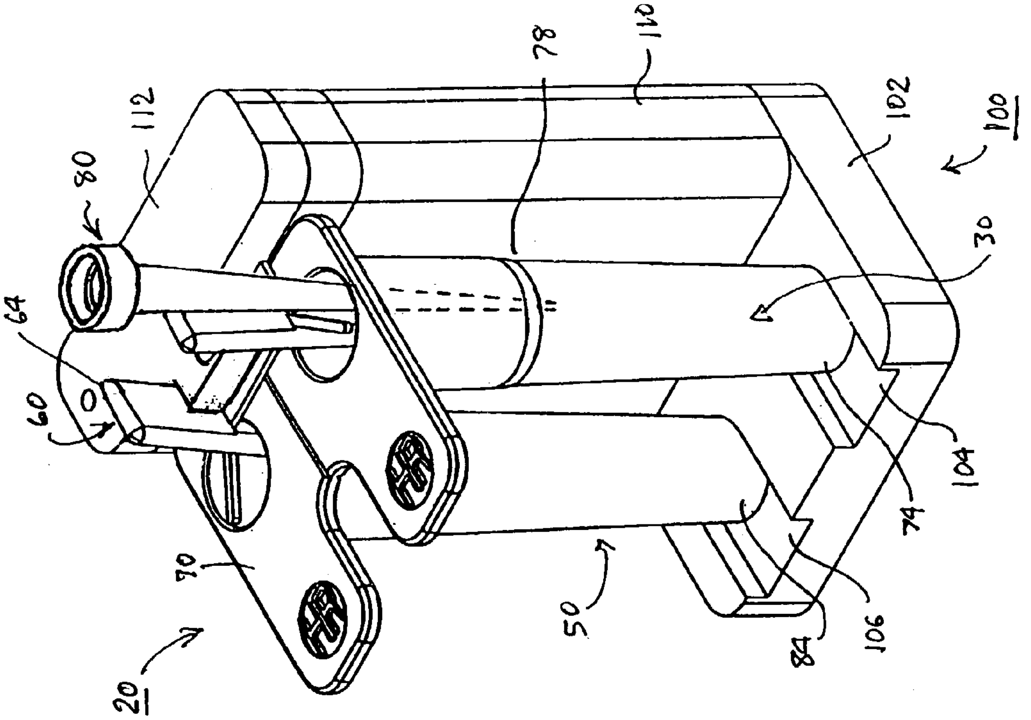
FIG. 8 is a perspective view of the two-cell test cartridge of FIG. 2 inserted into the cartridge holder of FIG. 3 with the plunger flags deflected aside and illustrating the injection of blood into the reaction chambers while the reaction chambers are illuminated.
Figure 7:
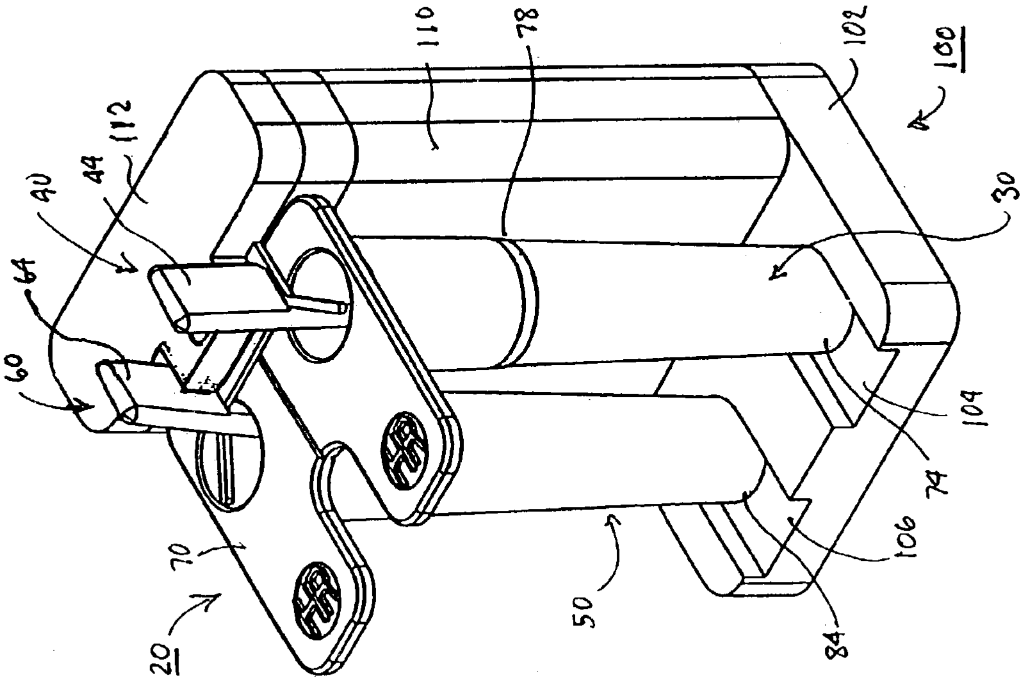
FIG. 7 is a perspective view of the two-cell test cartridge of FIG. 2 inserted into the cartridge holder of FIG. 3 with the plunger flags deflected aside to facilitate injection of blood into the reaction chambers while the reaction chambers are illuminated.

As shown in FIGS. 7 and 8, the cartridge holder 100 is dimensioned with respect to the test cartridge 20 to receive the upper cartridge plate 70 between the flag deflecting arms 118 and 120 and the pair of detents 114 and 116 when the cell free ends 74 and 84 are inserted into the recesses 104 and 106, respectively, so that the edge of the upper cartridge plate 70 bears against the rear frame 110 and the spring-loaded detent 126 holds the cartridge 20 vertically down against the base 20. The pair of detents 114 and 116 are designed to snap and secure the test cartridge 20 to the rear frame 110. Thus, the cartridge holder 100 provides a cartridge holder frame and test cartridge receptacle by contact with the upper, lower, and rear surfaces of the test cartridge. The defined cartridge receptacle receives the test cartridge 20 in an upright position or orientation. In this upright position, the flag deflecting arms 118 and 120 bear against and deflect the flags 44 and 64, respectively. Then, the pipette 80 or a syringe needle or other blood dispenser can be inserted through the upper openings 48 and 68 as shown in FIG. 8 to facilitate dispensing blood samples in the upper reaction chambers 32 and 42, respectively, without the risk that the test cartridge 20 will topple and spill the blood sample dispensed into the reaction chambers 32 and 42.

The user can therefore both dispense the blood samples into the upper reaction chambers 32 and 42 and observe the filling level of the dispensed blood while the flags 44 and 64 are deflected. The user need not touch either the test cartridge 20 or the cartridge holder 100 in the process. The tabs 72 and 82 can be grasped to pull the test cartridge 20 out of the cartridge receptacle defined by the cartridge frame of the cartridge holder 100 and insert it into the actuator heat 12 after the blood samples are safely and cleanly deposited in the upper reaction chambers 32 and 42.

In a second aspect of the invention, the cartridge holder 100 provides illumination of the reaction chambers 32 and 52 during filling with the blood samples, so that the user can judge when the reaction chambers 32 and 52 are properly filled with blood dispensed through the pipette 80 or the syringe or other blood dispenser. Thus, the rear frame 110 preferably further comprises a light emitter 108 through or from which diffuse light is emitted. The light emitter 108 can be a transparent or translucent panel covering a conventional incandescent, halogen or fluorescent lamp and reflector within the rear frame 110 or can be an electro-luminescent flat panel. The light emitter 108 can be powered by batteries within the rear frame 110 or by an electrical cord connection to electrical mains or to a power outlet of the ACT test instrument 10.

The fill line 78 is a feature of the mold used to manufacture cartridge 20. Illumination of the line would assist the operator locating the lines, especially in low light conditions. If the fill line 78 is enhanced with a fluorescent color, illumination by light emitter 108 will help the fill line 78 fluoresce.

In a third aspect of the invention that may be used with or without the light emitter 108, the cartridge holder 100 incorporates at least one optical lens supported by the cartridge holder frame and disposed with respect to the cartridge receptacle to magnify the image of the reaction chambers 32, 52 of the cartridge cells 30, 50 viewed through the optical lens. The magnification of the image viewed through the lens facilitates filling the reaction chambers 32, 52 with blood, so that the user can better see when the reaction chamber is properly filled with blood dispensed from the pipette 80 to the fill lines on the cartridge cells 30 and 50.

Figure 9:
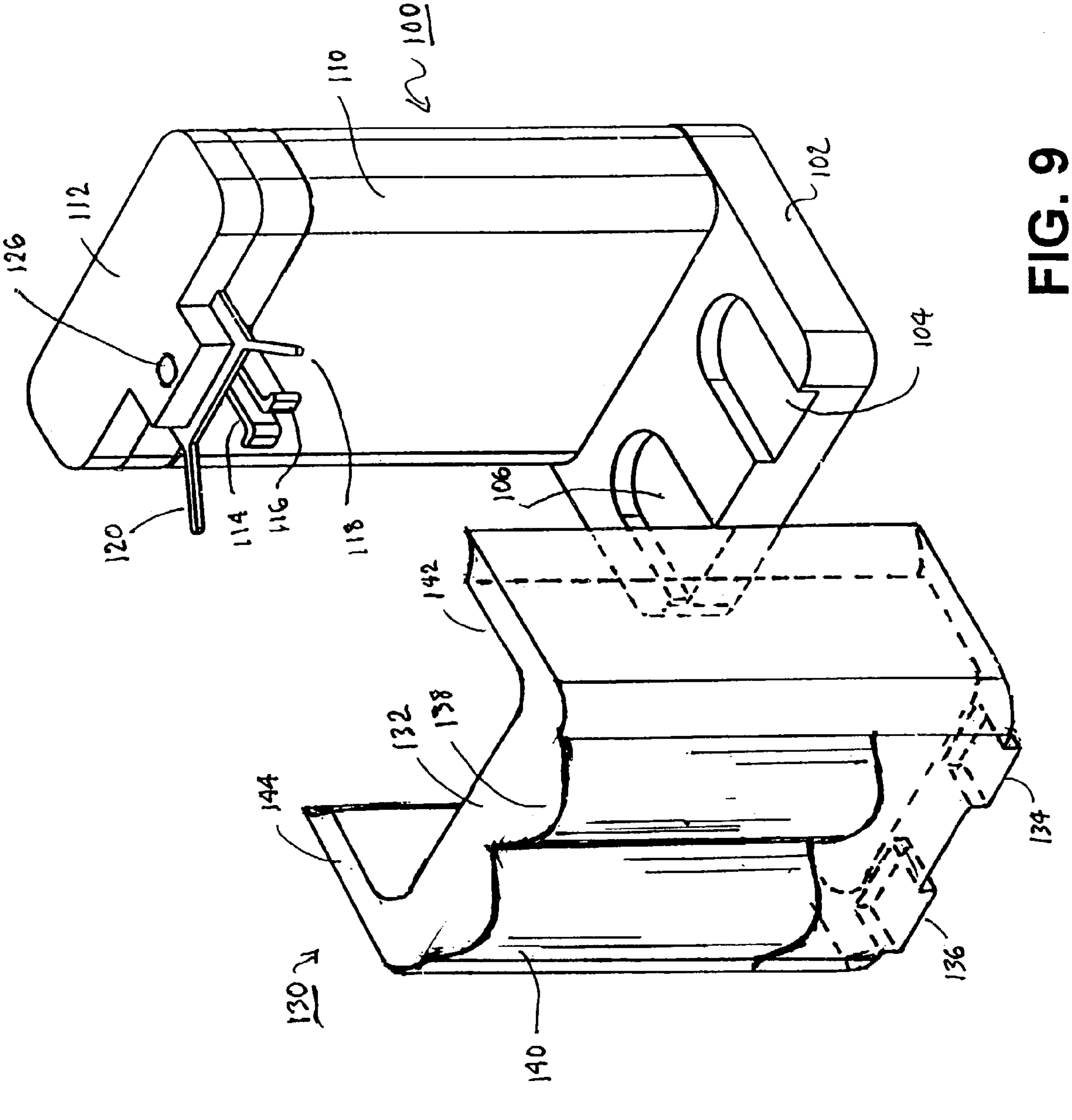
FIG. 9 is an exploded perspective view of a further embodiment of a cartridge holder incorporating a pair of vertical lens on a lens cover adapted to be disposed in front of the cartridge cells to magnify the illuminated or non-illuminated reaction chambers of the two-cell test cartridge of FIG. 2 inserted into the cartridge holder.
Figure 12:
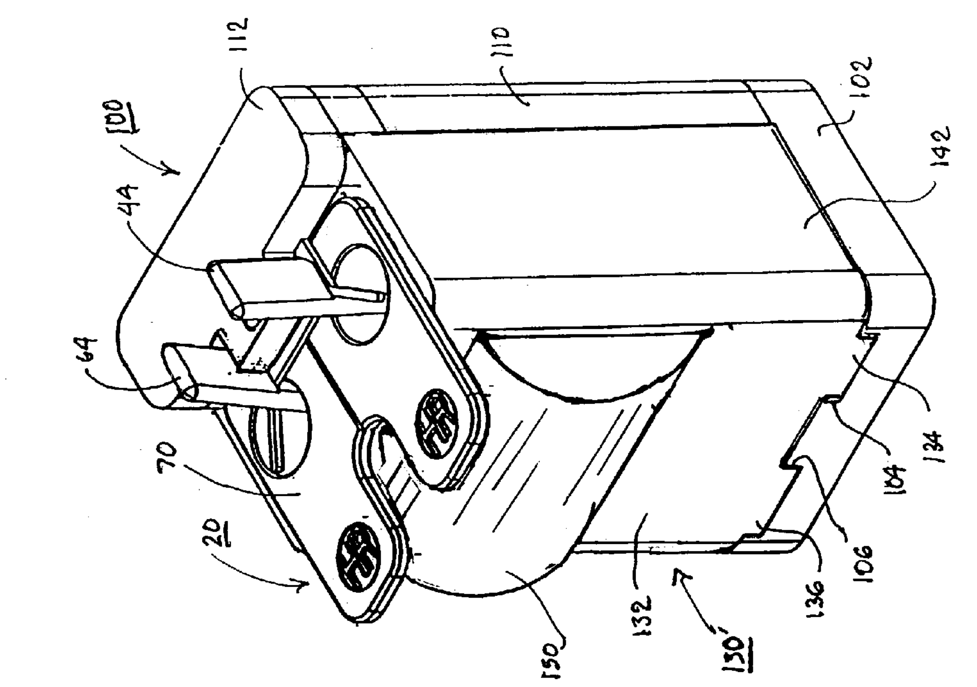
FIG. 12 is a perspective view of the lens cover of FIG. 11 disposed in front of the cartridge cells to magnify the illuminated or non-illuminated reaction chambers of the two-cell test cartridge of FIG. 2 inserted into the cartridge holder.
Figure 10:
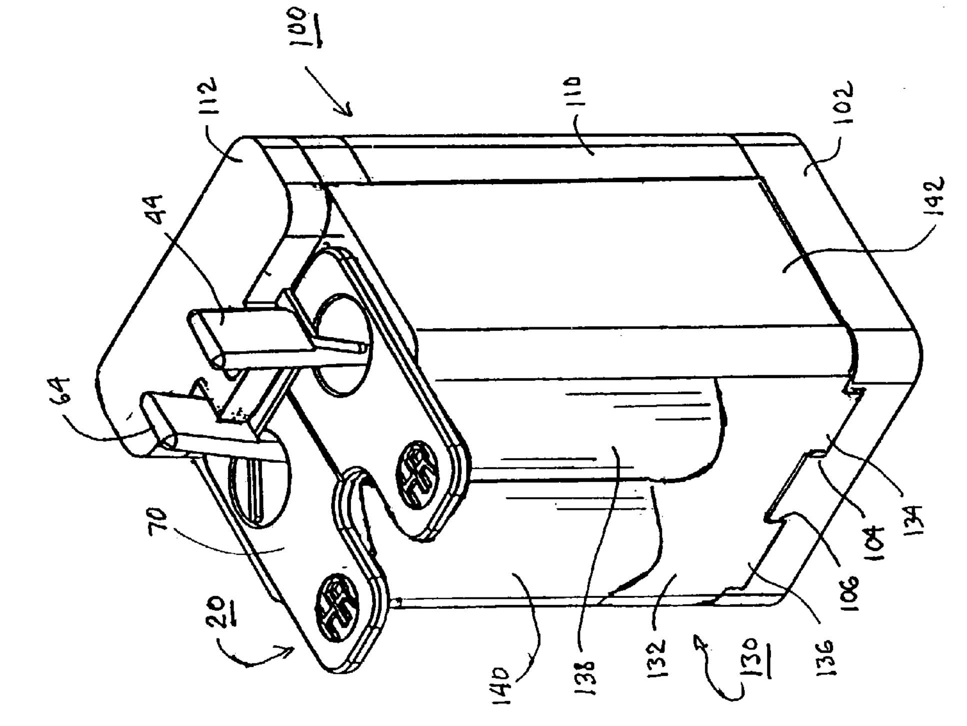
FIG. 10 is a perspective view of the lens cover of FIG. 9 disposed in front of the cartridge cells to magnify the illuminated or non-illuminated reaction chambers of the two-cell test cartridge of FIG. 2 inserted into the cartridge holder.

In accordance with this aspect of the invention, a lens covers 130 and 130' are provided as shown in FIGS. 9 and 10 and FIGS. 11 and 12, respectively, that fits around the test cartridge 20 supported by the cartridge holder 100. The lens cover 130, 130' is preferably shaped and dimensioned to fit between the lower surface of the upper cartridge plate 70 and the upper surface of the base 102. The lens cover 130, 130' comprises a front panel 132 joined to side panels 142 and 144. Guides 134 and 136 are formed extending from the lower edges of the front panel 132 dimensioned to be received in the recesses 104 and 106 in front of the cell free ends 74 and 84, respectively. In use, the test cartridge 20 is fitted into the cartridge holder 100, and the lens covers 130 and 130' are fitted around the test cartridge 20 as shown in FIGS. 10 and 12.

In the first embodiment of the lens cover 130 depicted in FIGS. 9 and 10, two vertically disposed lenses 138 and 140 are supported on or integrally formed with the front panel 132 in alignment lengthwise with the cartridge cells 30 and 50. Magnified images of the cartridge cells 30 and 50 can be seen by the user to aid in seeing the fill lines on the cartridge cells 30 and 50 as blood is dispensed into the upper reaction chambers 32 and 52. The lens cover 130 can advantageously be formed of a transparent material so that lenses 138 and 140 can be integrally formed with the front panel 132, the side panels 142 and 144 and the guides 134 and 136. Or, the lenses 138 and 140 can be formed as an integral unit that is fitted into and extends through the front panel 132.

Figure 11:
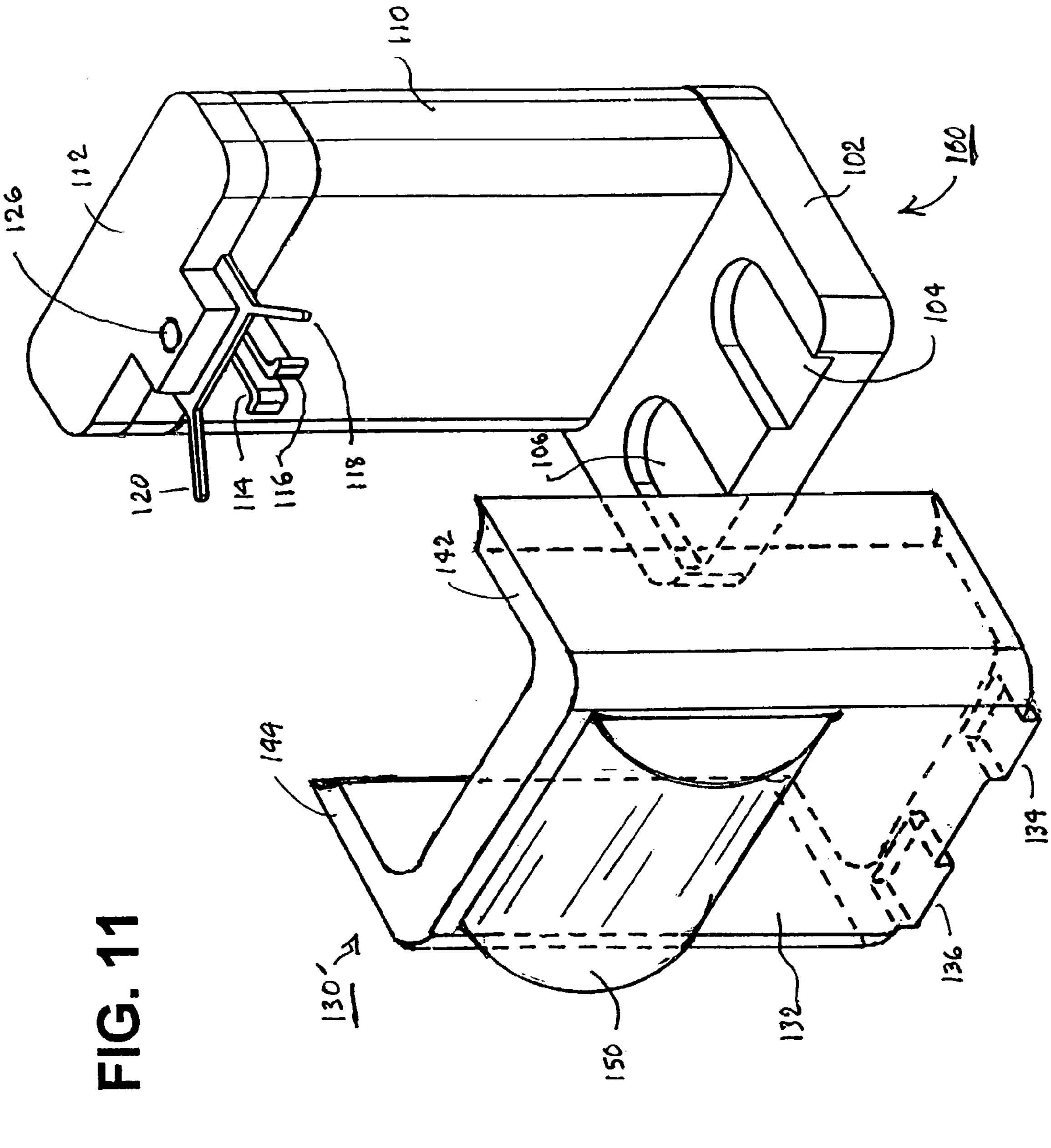
FIG. 11 is an exploded perspective view of a further embodiment of a cartridge holder incorporating a horizontal lens on a lens cover adapted to be disposed in front of the cartridge cells to magnify the illuminated or non-illuminated reaction chambers of the two-cell test cartridge of FIG. 2 inserted into the cartridge holder.

In the second embodiment of a lens cover 130' depicted in FIGS. 11 and 12, a single horizontally disposed lens element 150 is supported on or integrally formed with the front panel 132 to extend across the upper reaction chambers 32 and 52 of the respective cartridge cells 30 and 50. Magnified images of the cartridge cells 30 and 50 can be seen by the user to aid in seeing the fill lines on the cartridge cells 30 and 50 as blood is dispensed into the upper reaction chambers 32 and 52. The lens cover 130' can also advantageously be formed of a transparent material so that lens 150 can be integrally formed with the front panel 132, the side panels 142 and 144 and the guides 134 and 136. Or, the lens 150 can be fitted into and extend through the front panel 132.

In a variation, the guides 134 and 136 can be eliminated and one of the side panels 142 or 144 of the lens covers 130 and 130' can be hinged to one edge of the rear frame 10. In this variation, the lens covers 130 and 130' can be moved about the hinge between an open position to receive or remove a test cartridge 20 and a closed position for filling the upper reaction chambers 32 and 52 of the respective cartridge cells 30 and 50 with blood.

In a further variation, the lens covers 130 and 130' can be formed integrally with the rear frame 110 and base 102. The flag deflector 112 would, in that instance, be movable with respect to the rear frame to an open position to receive or remove a test cartridge 20 vertically from between the rear frame 110 and the lens covers 130 and 130' and a closed position for filling the upper reaction chambers 32 and 52 of the respective cartridge cells 30 and 50 with blood.

It will also be understood that the above-described embodiments of the test cartridge 100 can also be conveniently incorporated into or attached to the case of the ACT instrument 10 with or without use of the lens covers 130 and 130'.

It will be understood that the test cartridge holders of the present invention can be employed with the above-described ACT instrument 10 or with other analytic instruments capable of employing test cartridges operating with a plunger and flag.

All patents and publications referenced herein are hereby incorporated by reference in their entireties.

It will be understood that certain of the above-described structures, functions and operations of the above-described preferred embodiments are not necessary to practice the present invention and are included in the description simply for completeness of an exemplary embodiment or embodiments.

In addition, it will be understood that specifically described structures, functions and operations set forth in the above-referenced patents can be practiced in conjunction with the present invention, but they are not essential to its practice.

It is to be understood, that within the scope of the appended claims, the invention may be practiced otherwise than as specifically described without actually departing from the spirit and scope of the present invention. The disclosed embodiments are presented for purposes of illustration and not limitation, and the present invention is limited only by the claims that follow.

The invention claimed is:

1. A cartridge holder for facilitating filling of at least one cartridge cell of a test cartridge with a blood sample dispensed from a blood sample dispenser through an upper end opening of a reaction chamber of the cartridge cell for conducting a blood coagulation test, the cartridge cell employing a plunger that is lifted during mixture of the blood sample with a reagent by engagement of a lift mechanism with a plunger upper end that extends from the cartridge cell, the cartridge holder comprising:

a cartridge holder frame having a test cartridge receptacle that receives and supports the test cartridge in an upright position so that blood sample can be dispensed into the reaction chamber of the cartridge cell; and a plunger upper end deflector extending from the cartridge holder frame that deflects the plunger upper end toward a side of the upper end opening as the test cartridge is inserted into the test cartridge receptacle to enable the insertion of the blood dispenser through the upper end opening and into the reaction chamber of the cartridge cell, wherein the cartridge holder frame comprises a lower base and a rear frame configured to provide the test cartridge receptacle that receives and supports the test cartridge in the upright position; and the plunger upper end deflector comprises a deflecting arm that extends from the rear frame over the base to engage and deflect the plunger upper end, and wherein the rear frame comprises a light emitter that illuminates the reaction chamber of a cartridge cell disposed in the cartridge receptacle.

2. The cartridge holder of claim 1, further comprising an optical lens supported by the cartridge holder frame and disposed with respect to the cartridge receptacle to magnify the image of the reaction chamber of the cartridge cell viewed through the optical lens.

3. A cartridge holder for facilitating filling of at least one cartridge cell of a test cartridge with a blood sample dispensed from a blood sample dispenser through an upper end opening of a reaction chamber of the cartridge cell for conducting a blood coagulation test, the cartridge cell employing a plunger that is lifted during mixture of the blood sample with a reagent by engagement of a lift mechanism with a plunger upper end that extends from the cartridge cell, the cartridge holder comprising:

a cartridge holder frame having a test cartridge receptacle that receives and supports the test cartridge in an upright position so that blood sample can be dispensed into the reaction chamber of the cartridge cell; and a plunger upper end deflector extending from the cartridge holder frame that deflects the plunger upper end toward a side of the upper end opening as the test cartridge is inserted into the test cartridge receptacle to enable the insertion of the blood dispenser through the upper end opening and into the reaction chamber of the cartridge cell, further comprising a light emitter that illuminates the reaction chamber of a cartridge cell disposed in the cartridge receptacle, and further comprising an optical lens supported by the cartridge holder frame and disposed with respect to the cartridge receptacle to magnify the image of the reaction chamber of the cartridge cell viewed through the optical lens.

4. A cartridge holder for facilitating filling of at least one cartridge cell of a test cartridge with a blood sample dispensed from a blood sample dispenser through an upper end opening of a reaction chamber of the cartridge cell for conducting a blood coagulation test, the cartridge cell employing a plunger that is lifted during mixture of the blood sample with a reagent by engagement of a lift mechanism with a plunger upper end that extends from the cartridge cell, the cartridge holder comprising:

a cartridge holder frame having a test cartridge receptacle that receives and supports the test cartridge in an upright position so that blood sample can be dispensed into the reaction chamber of the cartridge cell; and plunger upper end deflector extending from the cartridge holder frame that deflects the plunger upper end toward a side of the upper end opening as the test cartridge is inserted into the test cartridge receptacle to enable the insertion of the blood dispenser through the upper end opening and into the reaction chamber of the cartridge cell, and further comprising an optical lens supported by the cartridge holder frame and disposed with respect to the cartridge receptacle to magnify the image of the reaction chamber of the cartridge cell viewed through the optical lens.

5. A cartridge holder for facilitating filling of at least one cartridge cell of a test cartridge having at least two elongated cartridge cells arranged side-by-side with a blood sample dispensed from a blood sample dispenser through an upper end opening of a reaction chamber of each cartridge cell for conducting a blood coagulation test, the cartridge cell employing a plunger in each cartridge cell that is lifted during mixture of the blood sample with a reagent by engagement of a lift mechanism with a plunger upper end that extends from the cartridge cell, the cartridge holder comprising:

a cartridge holder frame having a test cartridge receptacle that receives and supports the test cartridge in an upright position so that blood sample can be dispensed into the reaction chamber of at least one cartridge cell; and a plunger upper end deflector extending from the cartridge holder frame that deflects the plunger upper end of the plunger toward a side of the upper end opening as the test cartridge is inserted into the test cartridge receptacle to enable the insertion of the blood sample dispenser through the upper end opening and into the reaction chamber of the cartridge cell, wherein the cartridge holder frame comprises a lower base and a rear frame configured to provide the test cartridge receptacle that receives and supports the test cartridge in the upright position; and the plunger upper end deflector comprises a first deflecting arm that extends from the rear frame over the base to engage and deflect the plunger upper end of a first plunger in a first cartridge cell in a first direction and a second deflecting arm that extends from the rear frame over the base to engage and deflect the plunger upper end of a second plunger in a second cartridge cell in a second direction.

6. The cartridge holder of claim 5, wherein the rear frame compose a light emitter that illuminates the reaction chambers of the cartridge cells disposed in the cartridge receptacle.

7. The cartridge holder of claim 6, further comprising an optical lens supported by the cartridge holder frame and disposed with respect to the cartridge receptacle to magnify the images of the reaction chambers of the cartridge cells viewed through the optical lens.

8. The cartridge holder of claim 6, further comprising an elongated optical lens supported by the cartridge holder frame and disposed to extend across the cartridge receptacle to magnify the images of the reaction chambers of the cartridge cells viewed through the elongated optical lens.

9. The cartridge holder of claim 6, further comprising a plurality of elongated optical lenses supported by the cartridge holder frame, each elongated optical lens disposed to extend along the length of a cartridge cell in the cartridge receptacle to magnify the image of the reaction chamber of the cartridge cell viewed through the elongated optical lens.

10. The cartridge holder of claim 5, further comprising a light emitter that illuminates the reaction chamber of a cartridge cell disposed in the cartridge receptacle.

11. The cartridge holder of claim 10, further comprising an optical lens supported by the cartridge holder frame and disposed with respect to the cartridge receptacle to magnify the image of the reaction chamber of the cartridge cell viewed through the optical lens.

12. The cartridge holder of claim 10, further comprising an elongated optical lens supported by the cartridge holder frame and disposed to extend across the cartridge receptacle to magnify the images of the reaction chambers of the cartridge cells viewed through the elongated optical lens.

13. The cartridge holder of claim 10, further comprising a plurality of elongated optical lenses supported by the cartridge holder frame, each elongated optical lens disposed to extend along the length of a cartridge cell in the cartridge receptacle to magnify the image of the reaction chamber of the cartridge cell viewed through the elongated optical lens.

14. The cartridge holder of claim 9, further comprising an optical lens supported by the cartridge holder frame and disposed with respect to the cartridge receptacle to magnify the image of the reaction chamber of the cartridge cell viewed through the optical lens.

15. The cartridge holder of claim 9, further comprising an elongated optical lens supported by the cartridge holder frame and disposed to extend across the cartridge receptacle to magnify the images of the reaction chambers of the cartridge cells viewed through the elongated optical lens.

16. The cartridge holder of claim 9, further comprising a plurality of elongated optical lenses supported by the cartridge holder frame, each elongated optical lens disposed to extend along the length of a cartridge cell in the cartridge receptacle to magnify the image of the reaction chamber of the cartridge cell viewed through the elongated optical lens.

17. A method of filling a reaction chamber of at least one cartridge cell of a test cartridge with a blood sample through an upper end opening of the reaction chamber for conducting a blood coagulation test, the cartridge cell employing a plunger that is lifted during mixture of the blood sample with a reagent by engagement of a lift mechanism with a plunger upper end that extends from the cartridge cell, the cartridge holder further comprising: inserting the test cartridge into a test cartridge receptacle of a cartridge holder frame that receives and supports the test cartridge in an upright position and has a plunger upper end deflector extending from the cartridge holder frame that deflects the plunger upper end toward a side of the upper end opening as the test cartridge is inserted into the test cartridge receptacle; inserting a blood dispenser into the upper end opening and into the reaction chamber of the cartridge cell; and dispensing the blood sample into the reaction chamber of the cartridge cell and further comprising disposing an optical lens with respect to the cartridge receptacle to magnify the image of the reaction chamber of the cartridge cell viewed through the optical lens.

18. A method of filling a reaction chamber of at least one cartridge cell of a test cartridge with a blood sample through an upper end opening of the reaction chamber for conducting a blood coagulation test, the cartridge cell employing a plunger that is lifted during mixture of the blood sample with a reagent by engagement of a lift mechanism with a plunger upper end that extends from the cartridge cell, the cartridge holder further comprising: inserting the test cartridge into a test cartridge receptacle of a cartridge holder frame that receives and supports the test cartridge in an upright position and has a plunger upper end deflector extending from the cartridge holder frame that deflects the plunger upper end toward a side of the upper end opening as the test cartridge is inserted into the test cartridge receptacle; inserting a blood dispenser into the upper end opening and into the reaction chamber of the cartridge cell; and dispensing the blood sample into the reaction chamber of the cartridge cell and further comprising emitting light from a light emitter in the rear frame to illuminate the reaction chamber of a cartridge cell disposed in the cartridge receptacle.

19. The method of claim 18, further comprising disposing an optical lens with respect to the cartridge receptacle to magnify the image of the reaction chamber of the cartridge cell viewed through the optical lens.

20. A method of filling a reaction chamber of at least one cartridge cell of a test cartridge with a blood sample through an upper end opening of the reaction chamber for conducting a blood coagulation test, the cartridge cell employing a plunger that is lifted during mixture of the blood sample with a reagent by engagement of a lift mechanism with a plunger upper end that extends from the cartridge cell, the cartridge holder further comprising: inserting the test cartridge into a test cartridge receptacle of a cartridge holder frame that receives and supports the test cartridge in an upright position and has a plunger upper end deflector extending from the cartridge holder frame that deflects the plunger upper end toward a side of the upper end opening as the test cartridge is inserted into the test cartridge receptacle; inserting a blood dispenser into the upper end opening and into the reaction chamber of the cartridge cell; and dispensing the blood sample into the reaction chamber of the cartridge cell, and further comprising disposing an optical lens with respect to the cartridge receptacle to magnify the image of the reaction chamber of the cartridge cell viewed through the optical lens.

* * * * *